UNITED STATES PATENT OFFICE.

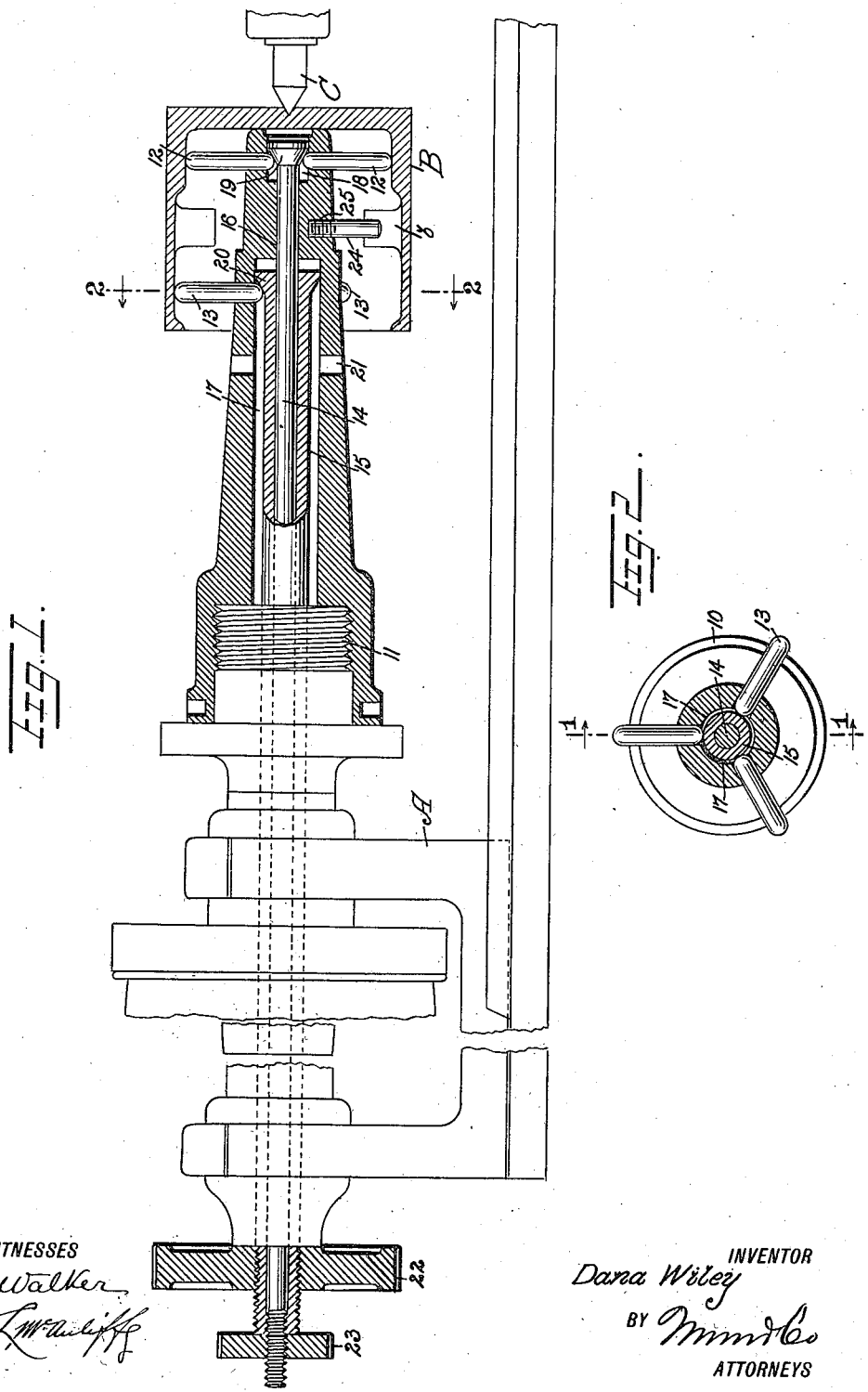

DANA WILEY, OF LONG BEACH, CALIFORNIA.

SELF-CENTERING WORK-HOLDER.

1,241,319.

Specification of Letters Patent. Patented Sept. 25, 1917.

Application filed March 22, 1917. Serial No. 156,545.

*To all whom it may concern:*

Be it known that I, DANA WILEY, a citizen of the United States, and a resident of Long Beach, in the county of Los Angeles and State of California, have invented a new and Improved Self-Centering Work-Holder, of which the following is a full, clear, and exact description.

My invention relates to a tool having the general character of an expanding mandrel and is mainly designed for use as a self-centering piston jig, being particularly useful in machining pistons in one setting and especially advantageous in machining over-sized pistons for reground or rebored automobile cylinders.

The prime object of the invention is to insure the centering of a piston or other piece of tubular work with absolute accuracy and with facility and despatch. The stated object is attained by a body or member adapted to be secured to the head-stock of a lathe and provided with separate sets of radially movable pins or the like, and of controlling means therefor for centering a piston for example, at the head and skirt. The arrangement is such that the controlling means serves to independently and optionally expand the respective sets of pins to an approximate adjustment against the inner surface of the piston or other piece of work, and after the approximate adjustment, the simultaneous final adjustment and locking of both sets of pins is effected.

The invention will be particularly explained in the specific description following which will disclose other objects of the invention as well as the advantages thereof.

Reference is to be had to the accompanying drawings forming a part of this specification in which similar reference characters indicate corresponding parts in both views.

Figure 1 is a longitudinal vertical section of a centering device embodying my invention, showing the same in use, the plane of the section being indicated on the line 1—1, Fig. 2;

Fig. 2 is a cross section on the line 2—2, Fig. 1, the piece of work being omitted.

In carrying out my invention a mandrel body 10 is provided, having suitable means to secure the same to the head-stock A of a lathe, there being shown threads 11 on said mandrel for the purpose. In order to center a piston B or like piece of work at the head thereof and at the skirt, a set of radially disposed head pins 12 is disposed on the mandrel at the front end thereof, and a set of skirt pins 13 rearward of the first set.

Co-axial with the mandrel body 10 and with each other, are a rod 14 and a tube 15 thereon longitudinally movable to expand the respective pins. The rod 14 and tube 15 are adapted to extend through the spindle of the head-stock and at the forward end the rod 14 is disposed in an axial bore 16 of the body, there being a counter-bore 17 to accommodate the tube 15 and a conical head 20 thereon. At the forward end of the bore 16, there is a counter-bore or chamber 18 accommodating the conical head 19 of the rod 14, adapted to bear against the inner ends of the pins 12, while the conical head 20 is adapted to bear against the inner ends of the pins 13. The respective pins are freely movable in radial holes in the body 10 and there may be, as shown in Fig. 1, an additional set of holes 21 positioned to accommodate the pins 13 in a more rearward position in case of a longer piston than that illustrated in Fig. 1.

The rear ends of the rod 14 and tube 15 which in practice extend beyond the lathe spindle, are externally threaded and receive nuts 22, 23 preferably in the form of hand wheels. In practice, therefore, the piston B having been placed on the mandrel with the head thereof against the front end of the mandrel body, the nut 22 is run on the tube to have a snug bearing against the end of the lathe spindle to thereby draw the tube 15 outwardly to cause the head 20 to force the skirt pins 13 outwardly into contact with the inner surface of the work. The nut 23 is now run on the rod 14 against the end of the tube 15 to draw the rod rearwardly and cause the head 19 thereof to expand the head pins 12 into engagement with the piston. Thus the respective sets of pins are separately and independently actuated to effect the approximate adjustment and since the nut or wheel 22 bears against the end of the lathe spindle, a further movement of the said nut will simultaneously adjust both sets of pins by reason of the fact that the tube exerts its thrust against the nut 23 of the rod, and thereby the final adjustment and locking action of both sets of pins are effected simultaneously following the initial separate adjustment.

I prefer to use the tail-stock C of the lathe, the piston being center-drilled for the purpose. In order not to depend on the pressure of the pins 12, 13 to turn the piston, I provide a stud 24 receivable in a radial tapped hole 25 in the mandrel between the respective sets of pins, there being a hole or holes provided in the mandrel, so positioned as to locate the stud 24 in a position to drive against a boss $b$ of the particular piston.

I wish to state in conclusion that although the illustrated example constitutes a practical embodiment of my invention, I do not limit myself strictly to the mechanical details herein illustrated, since manifestly the same can be considerably varied without departure from the spirit of the invention as defined in the appended claims.

Having thus described my invention I claim as new, and desire to secure by Letters Patent:

1. A centering device of the class described, including front centering elements and rear centering elements, both radially movable on said device to center the respective ends of the piece of work, and separate expanding means for the respective elements, said means being manually operable independently to effect an approximate adjustment of said elements, one of said expanding means being engageable with the other of said expanding means to effect the final adjustment of both the front and rear centering elements.

2. A centering device of the class described, including a mandrel body, front and rear sets of radially movable centering pins thereon, a rod co-axial with the mandrel and adapted to extend through and beyond the spindle of a head-stock, a tube surrounding the rod and extending adjacent to the rear end thereof, said tube and rod each having a conical head to bear against the respective sets of pins, the rear ends of said rod and tube being threaded, a nut on the threaded end of the tube adapted to bear against the lathe spindle, and a nut on the threaded end of the rod and movable thereon to engage the rear end of the tube, the rod and tube being adapted to be separately and independently actuated by the respective nuts to independently expand the respective sets of centering elements to produce initially an approximate adjustment thereof, and the nut of the tube being adapted to give a final movement to the tube and cause it to act on the nut of the rod to thereby simultaneously effect the final adjustment of both sets of elements.

3. A centering device of the class described, including a mandrel body, front and rear sets of radially movable centering pins thereon, a rod co-axial with the mandrel and adapted to extend through and beyond the spindle of a head-stock, a tube surrounding the rod and extending adjacent to the rear end thereof, said tube and rod each having a conical head to bear against the respective sets of pins, the rear ends of said rod and tube being threaded, a nut on the threaded end of the tube adapted to bear against the lathe spindle, and a nut on the threaded end of the rod and movable thereon to engage the rear end of the tube.

4. A centering device for pistons, including a mandrel body adapted to be secured in a lathe, radially movable centering elements, means to expand said elements, and a lateral stud on said body adjacent to the centering elements, and adapted to make driving contact with a boss of a piston.

DANA WILEY.